(12) United States Patent
Baetoniu

(10) Patent No.: US 7,389,316 B1
(45) Date of Patent: Jun. 17, 2008

(54) METHOD AND APPARATUS FOR TRUE RANDOM NUMBER GENERATION

(75) Inventor: Catalin Baetoniu, Toronto (CA)

(73) Assignee: Xilinx, Inc., San Jose, CA (US)

( * ) Notice: Subject to any disclaimer, the term of this patent is extended or adjusted under 35 U.S.C. 154(b) by 752 days.

(21) Appl. No.: 10/997,126

(22) Filed: Nov. 24, 2004

(51) Int. Cl.
 *G06F 1/02* (2006.01)
(52) U.S. Cl. ............... 708/250; 708/251; 708/252; 708/254; 708/255; 708/256
(58) Field of Classification Search ......... 708/250–256
See application file for complete search history.

(56) References Cited

U.S. PATENT DOCUMENTS

| | | | | |
|---|---|---|---|---|
| 4,860,236 | A * | 8/1989 | McLeod et al. | 708/250 |
| 7,082,449 | B2 * | 7/2006 | Rarick | 708/250 |
| 2003/0204541 | A1 * | 10/2003 | Shackelford et al. | 708/250 |
| 2004/0064491 | A1 * | 4/2004 | Rarick | 708/250 |

OTHER PUBLICATIONS

Xilinx, Inc.; "Virtex-II Platform FPGA Handbook"; published Dec. 2000; available from Xilinx, Inc., 2100 Logic Drive, San Jose, California 95124; pp. 33-75.

* cited by examiner

*Primary Examiner*—Michael Yaary
(74) *Attorney, Agent, or Firm*—Robert M. Brush

(57) ABSTRACT

Method and apparatus for true random number generation is described. One aspect of the invention relates to a digital logic circuit that includes N logic gates, where N is an integer greater than two. For each logic gate in the N logic gates: a first input terminal thereof is coupled to an output terminal thereof; a second input terminal thereof is coupled to an output terminal of a left neighbor thereof; and a third input terminal thereof is coupled to an output terminal of a right neighbor thereof. A sampling logic circuit may be provided to sample the output of the N logic gates to produce N-bit binary numbers. The N-bit binary numbers are true random numbers produced using pure digital logic without using an external source of randomness. A linear hybrid cellular automaton (LHCA) may be provided for scrambling output data of the sampling circuit.

19 Claims, 3 Drawing Sheets

US 7,389,316 B1

METHOD AND APPARATUS FOR TRUE RANDOM NUMBER GENERATION

FIELD OF THE INVENTION

One or more aspects of the present invention relate generally to digital logic circuits and, more particularly, to a method and apparatus for true random number generation.

BACKGROUND OF THE INVENTION

Presently, various applications exist that require the generation of random numbers. For example, random number generators are used in various encryption techniques for encrypting and protecting data. Some software algorithms and purely digital logic circuits exist that generate pseudorandom numbers. However, given a sequence of previously generated pseudorandom numbers, it may be possible to predict the next number produced. Thus, such software-based and pure-digital based random number generators are not suitable for applications requiring true random numbers, such as cryptography.

To generate truly random numbers, previous techniques have used an analog source of noise in the form of an external component as a source of randomness. However, in cryptography, such a solution opens an avenue of attack in that a "hacker" may attempt to influence the random source. Moreover, in some cases a pure digital circuit for generating random numbers is desirable, particularly when the random number generator is to be implemented within an integrated circuit. Use of an analog source of randomness does not allow for use of a pure digital circuit.

Accordingly, there exists a need in the art for generation of truly random numbers using digital logic and without using an external source of randomness.

SUMMARY OF THE INVENTION

Method and apparatus for true random number generation is described. One aspect of the invention relates to a digital logic circuit that includes N logic gates, where N is an integer greater than two. One of the N logic gates is an exclusive-NOR (XNOR) logic gate, and each remaining one of said N logic gates is an exclusive-OR (XOR) logic gate. Each of the N logic gates includes an output terminal, a first input terminal, a second input terminal, and a third input terminal. Each of the N logic gates includes a right neighbor in the N logic gates and a left neighbor in the N logic gates. For each logic gate in the N logic gates: the first input terminal thereof is coupled to the output terminal thereof; the second input terminal thereof is coupled to the output terminal of the left neighbor thereof; and the third input terminal thereof is coupled to the output terminal of the right neighbor thereof.

A sampling logic circuit may be provided to sample output data on the output terminal of each of the N logic gates. In one embodiment, the sampling logic circuit comprises N flip-flops. The sampling logic samples the output of the N logic gates in accordance with a clock signal to produce N-bit binary numbers for each cycle of the clock signal. The N-bit binary numbers are true random numbers produced using pure digital logic without using an external source of randomness. In one embodiment, a linear finite state machine (LFSM) is provided for scrambling output data of the sampling circuit. The LFSM may be a linear hybrid cellular automaton (LHCA).

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
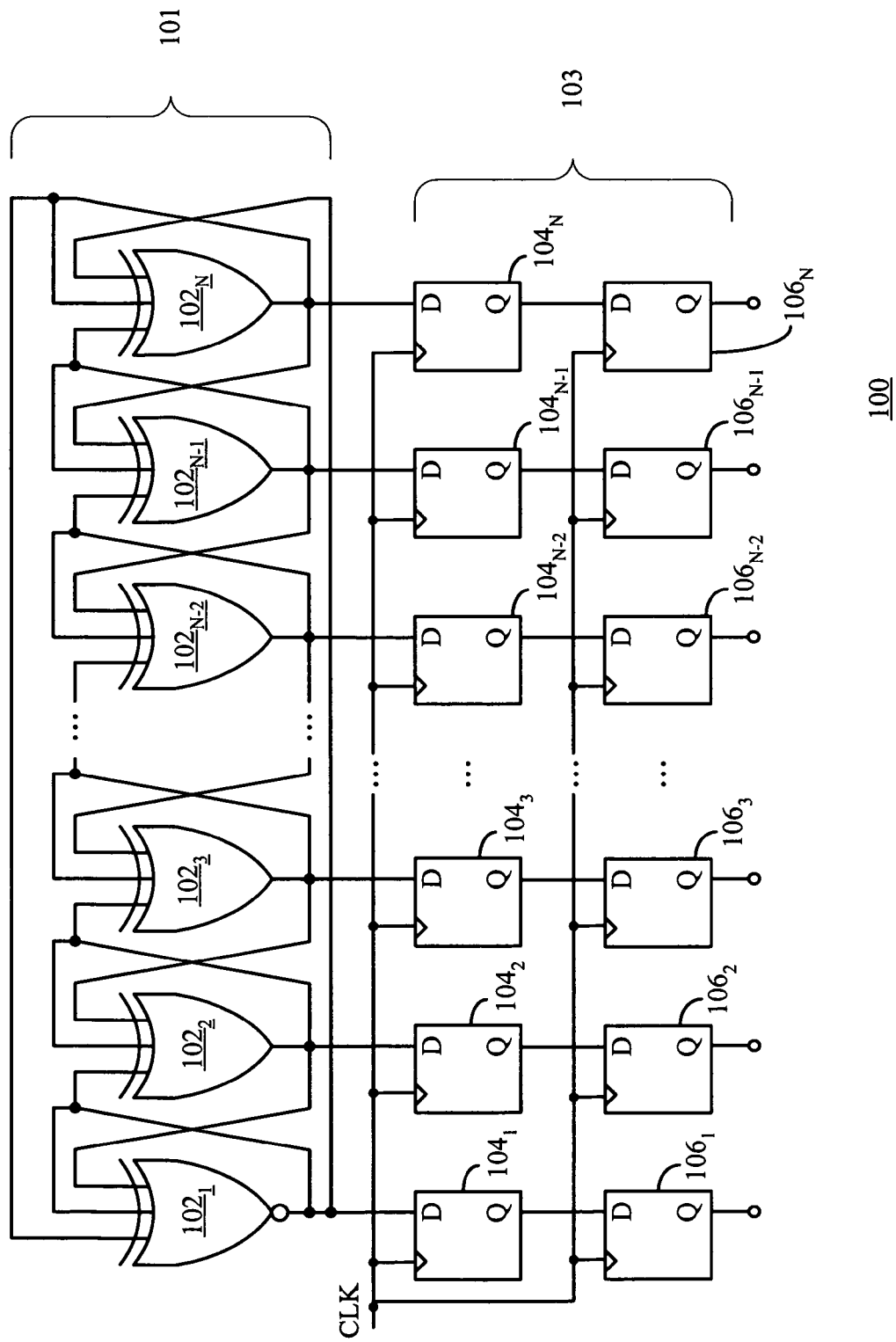
FIG. 1 is a block diagram depicting an exemplary embodiment of a random number generator constructed in accordance with the invention.

FIG. 1 is a block diagram depicting an exemplary embodiment of a random number generator 100 constructed in accordance with the invention. The random number generator 100 may be used to generate random numbers for various applications, such as various cryptographic applications. The random number generator 100 comprises a digital logic circuit 101 and a sampling logic circuit 103. The digital logic circuit 101 comprises a set of logic gates $102_1$ through $102_N$ (collectively referred to as logic gates 102), where N is an integer greater than two. The logic gates 102 include an exclusive NOR (XNOR) gate $102_1$ and exclusive OR gates $102_2$ through $102_N$. Each of the logic gates 102 includes an output terminal and three input terminals.

For each of the logic gates 102, a first input terminal thereof is coupled to the output terminal thereof. For each logic gate $102_i$, where $2 \leq i \leq N-1$ (i.e., the "inner gates"): (a) a second input terminal of the logic gate $102_i$ is coupled to the output terminal of the logic gate $102_{i-1}$ (i.e., the left neighbor of the logic gate $102_i$); and (b) a third input terminal of the logic gate $102_i$ is coupled to the output terminal of the logic gate $102_{i+1}$ (i.e., the right neighbor of the logic gate $102_i$). For the logic gate $102_1$: (a) a second input terminal thereof is coupled to the output terminal of the logic gate $102_N$ (i.e., its left neighbor); and (b) a third input terminal thereof is coupled to the output terminal of the logic gate $102_2$ (i.e., its right neighbor). For the logic gate $102_N$: (a) a second input terminal thereof is coupled to the output terminal of the logic gate $102_{N-1}$ (i.e., its left neighbor); and (b) a third input terminal thereof is coupled to the output terminal of the logic gate $102_1$ (i.e., its right neighbor). The logic gates $102_1$ and $102_N$ are referred herein as "boundary gates" and are considered neighbors.

In this manner, multiple XOR ring oscillators are interconnected to form a "generalized N-bit ring oscillator." In particular, each one of the XOR-based ring oscillators is connected with its two neighbors (the boundary gates are considered neighbors) thereby creating a ring of ring oscillators. The logic gates 102 operate asynchronously. Notably, there are no external inputs to the logic gates 102. Each of the logic gates 102 generates a bit via its output terminal such that the digital logic circuit 101 generates an N-bit binary number. Due to slight differences between logic delays of different paths through the logic gates 102, and to the noise present in any digital circuit, the N-bit output of the logic gates 102 exhibits chaotic behavior. The N-bit output will thus change randomly at a natural oscillating frequency, which is based on the gate propagation delays and the routing delays. Such delays are affected by temperature and voltage variations, as well as by system noise. The natural oscillating frequency is in the gigahertz range for modern digital logic. One of the logic gates 102 is an XNOR gate (e.g., the gate $102_1$) to prevent the oscillator from becoming trapped into a constant value state.

By sampling the output of the digital logic circuit 101 with an asynchronous clock, truly random binary values are obtained for each cycle of the clock. Thus, the digital logic circuit 101 is coupled to the sampling logic circuit 103, which comprises a set of storage cells $104_1$ through $104_N$. In the present embodiment, the storage cells 104 illustratively comprise D-type flip-flops, where each of the flip-flops 104 includes a data input terminal, a data output terminal, and a clock terminal. The output terminal of each of the logic gates $102_1$ through $102_N$ is respectively coupled to the data input terminals of the flip-flops $104_1$ through $104_N$. The N-bit output of the digital logic circuit 101 is sampled by the flip-flops 104 in accordance with a clock signal coupled to the clock terminal of each of the flip-flops 104.

If the output of the logic gates 102 is sampled at a rate lower than the natural oscillating frequency, random N-bit binary numbers are obtained. For example, the output of the digital logic circuit 101 may be sampled at various frequencies ranging between 125 MHz and 500 MHz, although the sampling rate is not limited to such a frequency range. While indeed random, the quality of the numbers produced by the logic gates 102 may not be suitable for all cryptographic uses. Notably, the probability distribution of the generated numbers is not uniform. In addition, as the sampling rate increases with respect to the natural oscillating frequency of the logic gates 102, the correlation between consecutive samples increases. As described below with respect to FIG. 2, further processing may be done to increase the quality of the random numbers.

Since the outputs of the logic gates 102 change asynchronously, the sampling flip-flops 104 may become metastable such that the output values cannot be used reliably in more than one place. This metastability advantageously provides a source of random data. In order to provide a stable and valid logic value for each bit of the N-bit binary number, however, in one embodiment, the output of the digital logic circuit 101 may be double sampled. In such an embodiment, the sampling logic circuit 103 includes a second set of storage cells $106_1$ through $106_N$ (e.g., D-type flip-flops). The data input terminals of the flip-flops 106 are respectively coupled to the data output terminals of the flip-flops 104. The clock input terminals of the flip-flops 106 are configured to receive the clock signal applied to the flip-flops 104.

In this manner, one embodiment of the invention is capable of generating truly random N-bit binary numbers using only digital logic. Since no external components are used as a source of randomness, this embodiment is inherently more secure than other hardware implementations that exploit external sources of noise. In particular, the embodiment eliminates one avenue of attack that would try to manipulate the random number generator to compromise a cryptographic application, for example. In addition, the embodiment is scalable to generate random binary words of any number of bits. Also, since the interconnections between the logic gates 102 are local (i.e., long routes between gates are not necessary), the highest possible oscillating frequency may be obtained, independent of the actual number of the logic gates 102 used.

Figure 2:
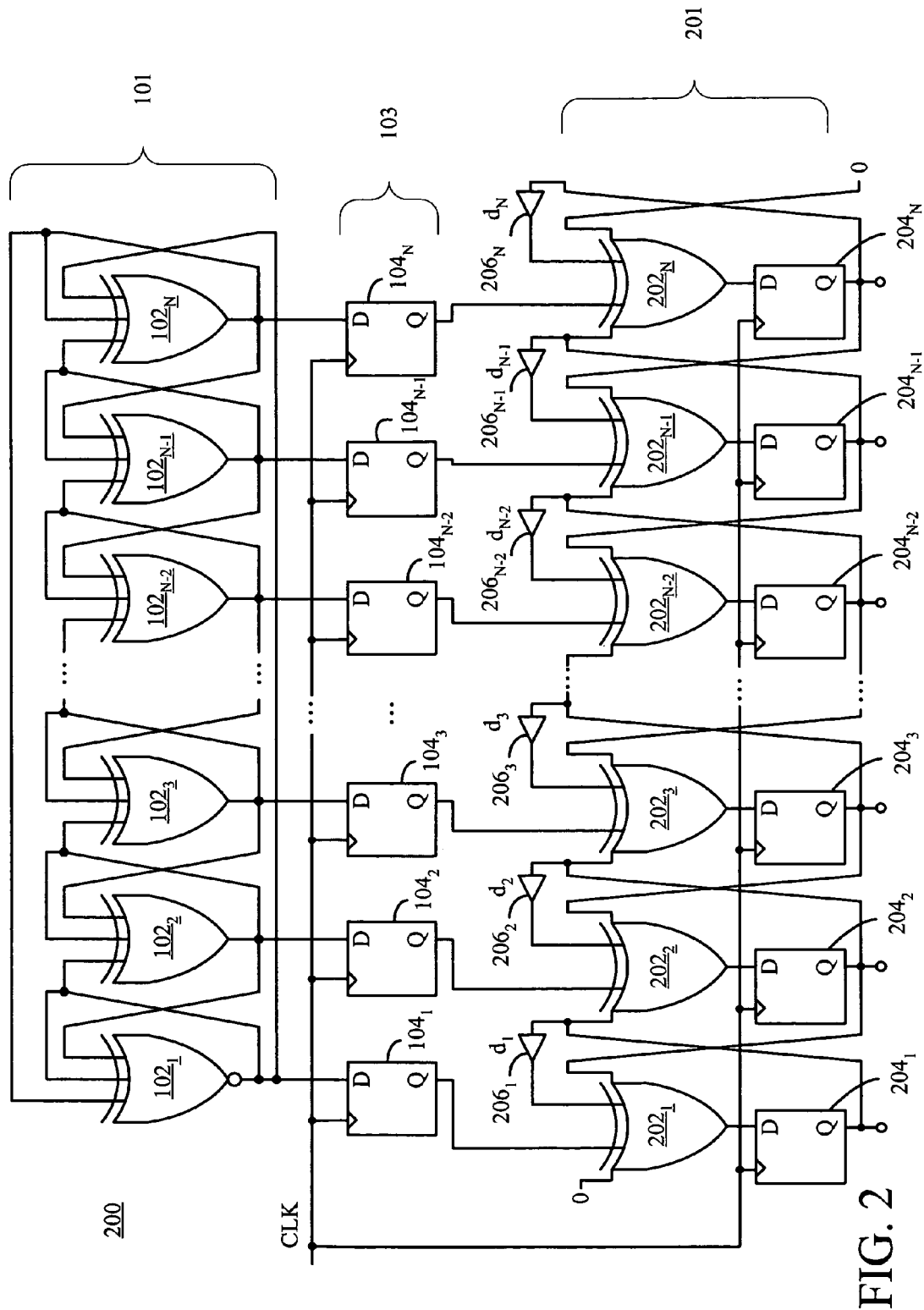
FIG. 2 is a block diagram depicting another exemplary embodiment of a random number generator constructed in accordance with the invention.

FIG. 2 is a block diagram depicting another exemplary embodiment of a random number generator 200 constructed in accordance with the invention. Elements of FIG. 2 that are the same or similar to elements of FIG. 1 are designated with identical reference numerals and are described in detail above. The random number generator 200 comprises the digital logic circuit 101, the sampling circuit 103, and a linear hybrid cellular automaton (LHCA) circuit 201. The digital logic circuit 101 is coupled to the sampling circuit 103 as described above with respect to FIG. 1. The output data terminals of the sampling circuit 103 are coupled to input data terminals of the LHCA 201. The LHCA 201 operates synchronously using the clock signal coupled to the sampling circuit 103. As described below, the LHCA 201 scrambles the output of the sampling circuit 103 to produce high-quality random numbers.

Linear feedback cellular automata are well-known in the art. For purposes of exposition, LHCAs are briefly described. An LHCA is considered a linear finite state machine (LFSM) and may comprise a one-dimensional array of cells (a one-dimensional cellular automaton). Cells are only allowed to communicate with their immediate neighbors. There are $2^{2^3}=256$ possible distinct cellular automata rules in one dimension with a three-cell neighborhood. However, only a combination of linear rules 90 and 150 can yield an LHCA with a maximum length cycle. Each cell in a set of cells (s) can hold either '0' or '1'. At every clock cycle, each cell receives input from its nearest neighbors. The cells at the boundary of the array always receive a '0'. The computation rules 90 and 150 are defined as follows:

$$s_i^+ = s_{i-1} + s_{i+1} \quad \text{Rule 90}$$

$$s_i^+ = s_{i-1} + s_i + s_{i+1} \quad \text{Rule 150}$$

where $s_i$ is the present state of the ith cell, $s_i^+$ is the next state of the ith cell, $s_{i-1}$ is the present state of the $i-1^{st}$ cell, $s_{i+1}$ is the present state of the $i+1^{st}$ cell, and the + operation denotes modulo-2 addition (exclusive-OR).

A rule vector $[d_1\ d_2\ \ldots\ d_n]$ is used to represent an n-cell LHCA, where $d_i$ is either '0', if the ith cell uses rule 90, or '1' if the ith cell uses rule 150 for $1 \leq i \leq n$. For any LHCA, a state transition matrix may be formed. The characteristic polynomial of the state transition matrix is the characteristic polynomial of the LHCA. If the characteristic polynomial of the state transfer matrix is primitive, the LHCA will generate a maximum length pseudo-random sequence. A specific rule vector must be used to implement a given primitive characteristic polynomial. Rule vectors for all LHCAs of orders 2 through 8, as well as one exemplary rule vector for orders 9 through 64 are given in Appendix A. In Appendix A, the first column of the table represents the order of the characteristic polynomial, the second column represents the rule vector in hexadecimal format, and the third column represents the characteristic polynomial coefficients in hexadecimal format. For example, a rule vector of [0 1 1 1 1] (e.g., hexadecimal 0x0F) and characteristic polynomial coefficients of [1 0 0 1 0 1] (e.g., hexadecimal 0x25) yields an order 5 LHCA having a characteristic polynomial of $x^5+x^2+1$.

The output of an LHCA has a very uniform probability distribution, but it is not random and consecutive samples are strongly correlated. That is, given a sequence of previously generated numbers, the next number to be generated by the LHCA can be predicted. In accordance with an embodiment of the invention, the next state of each cell in the LHCA 201 may be modified randomly from its intended value under rules 90 and 150. Thus, the LHCA 201 will produce truly random numbers, rather than a pseudorandom sequence of numbers. Stated differently, the LHCA 201 scrambles the output of the digital logic circuit 101 to produce truly random numbers having a uniform probability distribution.

Returning to FIG. 2, the LHCA 201 comprises a set of XOR gates $202_1$ through $202_N$ (collectively referred to as XOR gates 202) and a set of storage cells $204_1$ through $204_N$. In one embodiment, each of the storage cells $204_1$ through $204_N$ comprises a D-type flip-flop (collectively referred to as flip-flops 204). The XOR gates 202 and the flip-flops 204 implement an N-cell LHCA. Each of the XOR gates 202 comprises an output terminal and four input terminals. Each of the flip-flops 204 includes a data input terminal and a data output terminal. The output terminals of the XOR gates $202_1$ through $202_N$ are respectively coupled to the data input terminals of the flip-flops $204_1$ through $204_N$. The clock terminals of the flip-flops 204 are configured to receive the clock signal that drives the sampling logic circuit 103.

First input terminals of the XOR gates $202_1$ through $202_N$ are respectively coupled to the output terminals of the flip-flops $104_1$ through $104_N$. For each XOR gate $202_i$, where $2 \leq i \leq N-1$ (i.e., the "inner XOR gates"): (a) a second input terminal of the XOR gate $202_i$ is coupled to the data output terminal of the flip-flop $204_{i-1}$ (i.e., the left neighbor of the XOR gate $202_i$); and (b) a third input terminal of the XOR gate $202_i$ is coupled to the data output terminal of the flip-flop $204_{i+1}$ (i.e., the right neighbor of the XOR gate $202_i$). For the XOR gate $202_1$: (a) a second input terminal thereof is configured to receive a logic '0'; and (b) a third input terminal thereof is coupled to the output terminal of the flip-flop $204_2$ (i.e., its right neighbor). For the XOR gate $202_N$: (a) a second input terminal thereof is coupled to the output terminal of the flip-flop $204_{N-1}$ (i.e., its left neighbor); and (b) a third input terminal thereof is configured to receive a logic '0'. The XOR gate $202_1$ and the XOR gate $202_N$ are referred to as the "boundary XOR gates."

For each XOR gate $202_i$, a fourth input terminal thereof may be coupled to the data output terminal of the flip-flop $204_i$, depending on the particular characteristic polynomial of the LHCA 201. Notably, if the ith cell of the LHCA 201 implemented by the flip-flop $204_i$ uses rule 150, then the fourth input terminal of the XOR gate $202_i$ is coupled to the data output terminal of the flip-flop $204_i$. If the ith cell of the LHCA 201 implemented by the flip-flop $204_i$ uses rule 90, then the fourth input terminal of the XOR gate $202_i$ is driven by a logic low ('0'). Thus, the source of the signal coupled to the fourth input terminal of each of the XOR gates 202 depends on the rule vector $[d_1 \; d_2 \; \ldots \; d]$. This is shown symbolically by the multipliers $206_1$ through $206_N$ (collectively referred to as multipliers 206), which are serially coupled between the fourth input terminal of each XOR gate $202_i$ and the data output terminal of the flip-flop $202_i$. Each multiplier $206_i$ multiplies its input signal by a '0' or a '1' depending on the value of $d_i$ in the rule vector (which is 0 for rule 90 and 1 for rule 150). Note that the multipliers 206 are symbolic in that the ith cell of the LHCA 201 may be physically implemented by either coupling the fourth input terminal of the XOR gate $202_i$ to the data output terminal of the flip-flop $204_i$, or driving the fourth input terminal of the XOR gate $202_i$ with a logic low.

Let the output of the flip-flops $104_i$ be denoted as $Q_i$, and let s represent the set of cells in the LHCA 201. The computation rules 90 and 150 are modified as follows:

$s_i^+ = s_{i-1} + s_{i+1} + Q_i$  Modified rule 90

$s_i^+ = s_{i-1} + s_i + s_{i+1} + Q_i$  Modified rule 150 where $s_i$ is the present state of the ith cell, $s_i^+$ is the next state of the ith cell, $s_{i-1}$ is the present state of the $i-1^{st}$ cell, $s_{i+1}$ is the present state of the $i+1^{st}$ cell, and the + operation denotes modulo-2 addition (exclusive-OR). Note that $s_0 = s_{N+1} = $ '0' (i.e., the cells at the boundary of the array always receive a '0'). Thus, the next state of each cell in the LHCA 201 may be modified randomly from its intended value under rules 90 and 150 in accordance with modified rules 90 and 150. In this manner, the LHCA 201 will produce truly random numbers having a uniform probability distribution, rather than a pseudorandom sequence of numbers.

In this manner, the random number generator 200 is capable of generating truly random N-bit binary numbers having a uniform probability distribution using only digital logic. Since no external components are used as a source of randomness, the random number generator 200 is inherently more secure than other hardware implementations that exploit external sources of noise. In addition, the random number generator 200 is scalable to generate random binary words of any number of bits. Also, since the interconnections between the logic gates 102 and the XOR gates 202 are local (i.e., long routes between gates are not necessary), the highest possible oscillating frequency may be obtained, independent of the actual number of the logic gates 102 and XOR gates 202 used. Good quality random numbers at very high data rates can be produced. For example, a 32-bit version of the random number generator 200 running at 500 MHz will generate random numbers at a rate of 16 gigabits per second (Gbps). Since the design is scalable, even higher rates may be achieved if a larger digital logic circuit 101 and LHCA 201 are used.

For purposes of clarity by example, the random number generator 200 has been described with respect to an LHCA. Those skilled in the art will appreciate that other types of LFSMs may be used to scramble the output of the digital logic circuit 101. For example, linear hybrid cellular automata are a generalization of linear feedback shift registers (LFSRs). A parallel implementation of an LFSR exists that will generate n pseudorandom bits every clock cycle. Such a parallel LFSR implementation may be used to scramble the output of the digital logic circuit 101. However, parallel LFSR implementations are typically larger and slower than an equivalent LHCA.

The random number generators of the present invention are particularly suitable to be implemented in an integrated circuit. For example, the random number generators may be implemented in mask-programmable integrated circuits, such as application specific integrated circuits (ASICs) or application specific standard products (ASSPs), as well as programmable logic devices (PLDs), such as field programmable gate arrays (FPGAS) and complex programmable logic devices (CPLDs).

Figure 3:
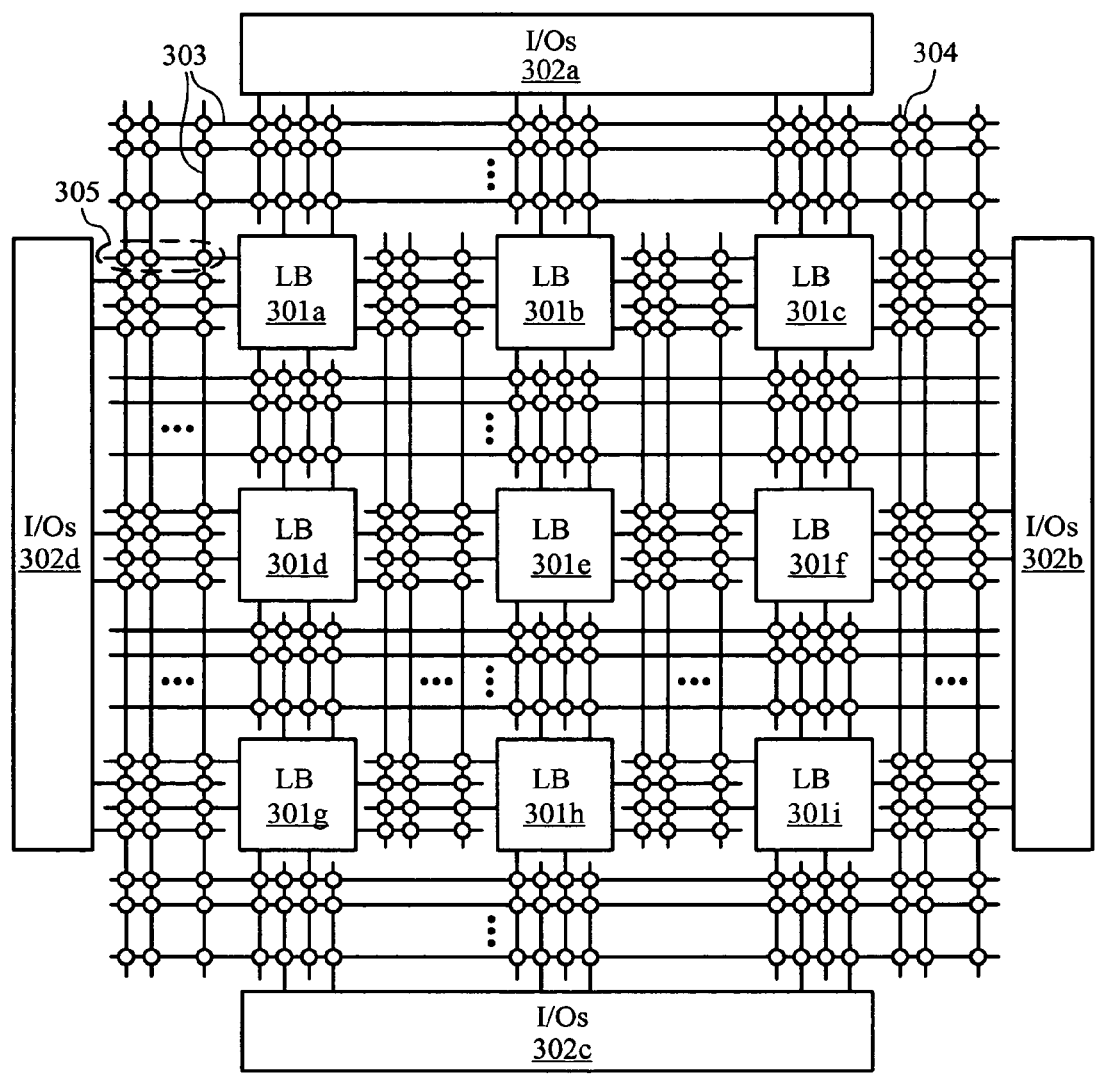
FIG. 3 is a block diagram depicting an exemplary embodiment of an FPGA in which the present invention may be employed.

Notably, FIG. 3 is a block diagram depicting an exemplary embodiment of an FPGA 300 in which the present invention may be employed. The FPGA 300 includes an array of configurable logic blocks (LBs 301a-301i, collectively LBs 301) and programmable input/output blocks (I/O blocks 302a-302d, collectively I/O blocks 302). The LBs 301 and the I/O blocks 302 are interconnected by a programmable interconnect structure that includes a large number of interconnect lines 303 interconnected by programmable interconnect points (PIPs 304, shown as small circles). Some of the PIPs 304 are often coupled into groups (e.g., group 305) that implement multiplexer circuits selecting one of several interconnect lines to provide a signal to a destination interconnect line or logic block. Some FPGAs also include additional logic blocks with special purposes (not shown), e.g., delay locked loops (DLLs), random access memory (RAM), and the like.

As is well known in the art, the LBs 301, I/O blocks 302, and the programmable interconnect structure may be configured to perform a variety of functions. Some or all of the LBs 301 may include one or more "slices" and programmable interconnect circuitry (not shown). Each LB slice in turn includes various circuits, such as flip-flops, function generators (e.g., a look-up tables (LUTs)), logic gates, memory, and like type well-known circuits. The LBs 301, I/O blocks 302, and the programmable interconnect structure are typically programmed by loading a stream of configuration data into internal configuration memory cells (not shown) that define how the programmable elements are configured. The configuration process of the FPGA 300 is also well known in the art. One such FPGA that may be used with the invention, the Xilinx Virtex®-II FPGA, is described in detail in pages 33-75 of the "Virtex-II Platform FPGA Handbook", published December, 2000, available from Xilinx, Inc., 2100 Logic Drive, San Jose, Calif. 95124, which pages are incorporated herein by reference.

The random number generators of some embodiments of the invention are ideal for implementation in an FPGA due to their scalability. The random number generator 100 of FIG. 1 may be implemented using a three-input LUT and one or two flip-flops for each output bit. The random number generator 200 of FIG. 2 may be implemented using two four-input LUTs and two flip-flops for each output bit. By using floorplanning and directed routing constraints when configuring an FPGA, the each of the random number generators will maintain the same high-speed and consistent operation independent of its size. Notably, since the interconnections between the logic gates 102 and the XOR gates 202 are local, long routes between LBs 301 may be avoided. As such, the highest possible oscillating frequency may be obtained, independent of the actual number of the logic gates 102 and XOR gates 202 used.

Embodiments of the invention have been described with respect to the use of XOR and XNOR gates. Those skilled in the art will appreciate that various types of logic circuits may be employed to implement a logical XOR gate and a logical XNOR gate, such as LUTs, AND gates, NAND gates, OR gates, NOR gates, and the like.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. A digital logic circuit for generating random numbers, comprising:
   N logic gates, N being an integer greater than two, where one of said N logic gates comprises an exclusive-NOR (XNOR) logic gate and each remaining one of said N logic gates comprises an exclusive-OR (XOR) logic gate;
   each of said N logic gates including an output terminal, a first input terminal, a second input terminal, and a third input terminal;
   each of said N logic gates having a right neighbor in said N logic gates and left neighbor in said N logic gates;
   where, for each logic gate of said N logic gates:
   said first input terminal thereof is coupled to said output terminal thereof;
   said second input terminal thereof is coupled to said output terminal of said left neighbor thereof; and
   said third input terminal thereof is coupled to said output terminal of said right neighbor thereof;
   a sampling logic circuit for sampling first output data on said output terminal of each of said N logic gates.

2. The digital logic circuit of claim 1, wherein said sampling logic circuit comprises:
   N first storage cells, each of said N first storage cells having a data input terminal and a data output terminal;
   where, for each storage cell of said N first storage cells, said data input terminal thereof is coupled to said output terminal of a respective one of said N logic gates.

3. The digital logic circuit of claim 2, wherein said sampling logic circuit further comprises:
   N second storage cells, each of said N second storage cells having a data input terminal and a data output terminal;
   where, for each storage cell of said N second storage cells, said data input terminal thereof is coupled to said data output terminal of a respective one of said N first storage cells.

4. The digital logic circuit of claim 3, wherein each of said N first storage cells and each of said N second storage cells comprises a flip-flop.

5. The digital logic circuit of claim 2, further comprising:
   a linear finite state machine (LFSM) for scrambling second output data on said data output terminal of each of said N first storage cells.

6. The digital logic circuit of claim 5, wherein said LFSM comprises a linear hybrid cellular automaton (LHCA).

7. The digital logic circuit of claim 6, wherein said LHCA comprises:
   N XOR gates, each of said N XOR gates having a plurality of input terminals and an output terminal;
   N flip-flops, each of said N flip-flops having a data input terminal and a data output terminal;
   where, for each of said N XOR gates: a first input terminal of said plurality of input terminals is coupled to said data output terminal of a respective one of said N first storage cells, and said output terminal thereof is coupled to said data input terminal of a respective one of said N flip-flops.

8. The digital logic circuit of claim 6, wherein said N logic gates, said sampling logic circuit, and said LHCA comprise at least a portion of an integrated circuit.

9. The digital logic circuit of claim 8, wherein said integrated circuit comprises a programmable logic device, and wherein said N logic gates, said sampling circuit, and said LHCA comprise configurable logic blocks of said programmable logic device.

10. A digital logic circuit for generating random numbers, comprising:
    N logic gates, N being an integer greater than two, where:
    one of said N logic gates comprises an exclusive-NOR (XNOR) logic gate and each remaining one of said N logic gates comprises an exclusive-OR (XOR) logic gate;
    each of said N logic gates including an output terminal, a first input terminal, a second input terminal, and a third input terminal;
    each of said N logic gates having a right neighbor in said N logic gates and a left neighbor in said N logic gates;
    for each logic gate of said N logic gates:

said first input terminal thereof is coupled to said output terminal thereof;
said second input terminal thereof is coupled to said output terminal of said left neighbor thereof; and
said third input terminal thereof is coupled to said output terminal of said right neighbor thereof;
N first flip-flops, each of said N first flip-flops having a data input terminal and a data output terminal, where, for each flip-flop of said N first flip-flops, said data input terminal thereof is coupled to said output terminal of a respective one of said N logic gates; and
a linear hybrid cellular automaton (LHCA) for scrambling output data on said data output terminal of each of said N first flip-flops.

11. The digital logic circuit of claim 10, wherein said LHCA comprises:
N XOR gates, each of said N XOR gates having a plurality of input terminals and an output terminal;
N second flip-flops, each of said N second flip-flops having a data input terminal and a data output terminal;
where, for each of said N XOR gates: a first input terminal of said plurality of input terminals is coupled to said data output terminal of a respective one of said N first flip-flops, and said output terminal thereof is coupled to said data input terminal of a respective one of said N second flip-flops.

12. The digital logic circuit of claim 10, wherein said N logic gates, said N first flip-flops, and said LHCA comprise at least a portion of an integrated circuit.

13. The digital logic circuit of claim 12, wherein said integrated circuit comprises a programmable logic device, and wherein said N logic gates, said N first flip-flops, and said LHCA comprise configurable logic blocks of said programmable logic device.

14. A method of generating random numbers, comprising:
providing N logic gates, N being an integer greater than two, where:
one of said N logic gates comprises an exclusive-NOR (XNOR) logic gate and each remaining one of said N logic gates comprises an exclusive-OR (XOR) logic gate;
each of said N logic gates including an output terminal, a first input terminal, a second input terminal, and a third input terminal;
each of said N logic gates having a right neighbor in said N logic gates and a left neighbor in said N logic gates;
for each logic gate of said N logic gates:
said first input terminal thereof is coupled to said output terminal thereof;
said second input terminal thereof is coupled to said output terminal of said left neighbor thereof; and
said third input terminal thereof is coupled to said output terminal of said right neighbor thereof;
sampling output data of said output terminal of each of said N logic gates in accordance with a clock signal to produce an N-bit binary number for each cycle of said clock signal.

15. The method of claim 14, further comprising:
scrambling each said N-bit binary number produced using a linear finite state machine (LFSM) configured to produce an N-bit pseudorandom number for each cycle of said clock signal.

16. The method of claim 14, wherein said step of sampling comprises:
double-sampling said output data in accordance with said clock signal.

17. Apparatus for generating random numbers, comprising:
N logic gates, N being an integer greater than two, where:
one of said N logic gates comprises an exclusive-NOR (XNOR) logic gate and each remaining one of said N logic gates comprises an exclusive-OR (XOR) logic gate;
each of said N logic gates including an output terminal, a first input terminal, a second input terminal, and a third input terminal;
each of said N logic gates having a right neighbor in said N logic gates and a left neighbor in said N logic gates;
for each logic gate of said N logic gates:
said first input terminal thereof is coupled to said output terminal thereof;
said second input terminal thereof is coupled to said output terminal of said left neighbor thereof; and
said third input terminal thereof is coupled to said output terminal of said right neighbor thereof;
means for sampling output data of said output terminal of each of said N logic gates in accordance with a clock signal to produce an N-bit binary number for each cycle of said clock signal.

18. The apparatus of claim 17, further comprising:
means for scrambling each said N-bit binary number produced by said sampling means.

19. The apparatus of claim 18, wherein said means for scrambling comprises a linear hybrid cellular automaton (LHCA).

* * * * *